(12) United States Patent
Coskun et al.

(10) Patent No.: US 8,112,797 B2
(45) Date of Patent: *Feb. 7, 2012

(54) SYSTEM AND METHOD TO PROVIDE BUILT-IN AND MOBILE VPN CONNECTIVITY

(75) Inventors: Risvan Coskun, Kanata (CA); Areef Reza, Kanata (CA); Luis Estable, Kanata (CA)

(73) Assignee: Research In Motion, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/975,835

(22) Filed: Dec. 22, 2010

(65) Prior Publication Data

US 2011/0093602 A1 Apr. 21, 2011

Related U.S. Application Data

(63) Continuation of application No. 11/284,884, filed on Nov. 23, 2005, now Pat. No. 7,882,557.

(51) Int. Cl.
*G06F 9/00* (2006.01)
*G06F 15/16* (2006.01)
*G06F 17/00* (2006.01)

(52) U.S. Cl. .......................................... 726/15; 709/229
(58) Field of Classification Search .................... 726/15; 709/229

See application file for complete search history.

(56) References Cited

U.S. PATENT DOCUMENTS

| | | | |
|---|---|---|---|
| 5,778,071 A | 7/1998 | Caputo et al. | |
| 7,565,689 B2 | 7/2009 | Brown et al. | |
| 7,882,557 B2 * | 2/2011 | Coskun et al. | 726/15 |
| 2002/0002627 A1 | 1/2002 | Stead et al. | |
| 2002/0069364 A1 | 6/2002 | Dosch | |
| 2003/0131245 A1 | 7/2003 | Linderman | |
| 2004/0054794 A1 * | 3/2004 | Lantto et al. | 709/229 |
| 2004/0268148 A1 * | 12/2004 | Karjala et al. | 713/201 |

FOREIGN PATENT DOCUMENTS

| | | |
|---|---|---|
| EP | 1278143 A | 1/2003 |
| EP | 1549018 A | 6/2005 |
| WO | 9857474 A | 12/1998 |

OTHER PUBLICATIONS

Weizsaker F: "Re: GSM-Krypto-Telefon" Internet Citation, [Online] XP002277710 Retrieved from the Internet: URL: http://www.fitug.de/debate/0003/msg00729.html> [retrieved on Apr. 22, 2004].

(Continued)

*Primary Examiner* — Kambiz Zand
*Assistant Examiner* — Aubrey Wyszynski
(74) *Attorney, Agent, or Firm* — Moffat & Co.

(57) ABSTRACT

A system and method for facilitating the establishment of a virtual private network between a network and a remote computer, the system having: a mobile device connectable to the remote computer and storing a user profile, virtual private network information, and password information; virtual private network software being located on one of the mobile device and the remote computer; an access point communicating with the network; and communication means for communications between the access point and one of the mobile device and the remote computer, wherein the user profile, virtual private network information, and password information is passed to the virtual private network software upon connection of the mobile device to the remote computer, the virtual private network software using the user profile, virtual private network information, and password information to establish a virtual private network through the communications means and the access point to the network.

20 Claims, 6 Drawing Sheets

OTHER PUBLICATIONS

"Get Smartcard Demonstration to Show Benefits of Smart Card Technology" Consensus Publication, Jan. 27, 1997, XP002080216.
XP863975, The Internet Protocol Journal vol. 1 No. 1, Jun. 1998 http://www.cisco.com/web/about/ac123/ac147/archived_issues/ipj_1-1/ipj_1-1.pdf.

Deutche Telecom AG: "Das TeleSec LineCrypt L fur sichere Netzwerkverbindungen", Linecrypt L Benutzerhandbuch, XX, XX, Apr. 14, 2000, page complete, XP002207127.
EP patent application No. 06-817-658.5, Summons to attend oral proceedings, dated Jul. 4, 2011.

* cited by examiner

SYSTEM AND METHOD TO PROVIDE BUILT-IN AND MOBILE VPN CONNECTIVITY

RELATED APPLICATIONS

The present application is a continuation of U.S. patent application Ser. No. 11/284,884, filed Nov. 23, 2005, the entire contents of which are incorporated herein by reference.

FIELD OF THE APPLICATION

The present application relates to the establishment of a virtual private network between a remote computer and a network, and in particular to the configuration of software to facilitate a virtual private network connection.

BACKGROUND

Virtual private networks require client software installed on the client side. A client application must be installed to facilitate connectivity and configuration of the client application for the virtual private network always requires a user profile integrated with the installed client application. Otherwise, virtual private network connection can never be obtained due to security policies.

When a user wishes to log into a network using a virtual private network, a preconfigured client at home or other remote location is required in order to log into the network.

Having a properly installed client and configuring the client can be problematic. Some VPN configuration is complicated and requires an in-depth knowledge to configure properly. Further, a user may not have the information required to configure the client readily available. Also, in some cases the user may not have privileges to install or configure software on the client machine, and in this case it may be impossible to connect to a VPN with the client machine.

BRIEF DESCRIPTION OF THE DRAWINGS

The present application will be better understood with reference to the drawings in which.

DETAILED DESCRIPTION

Figure 1:
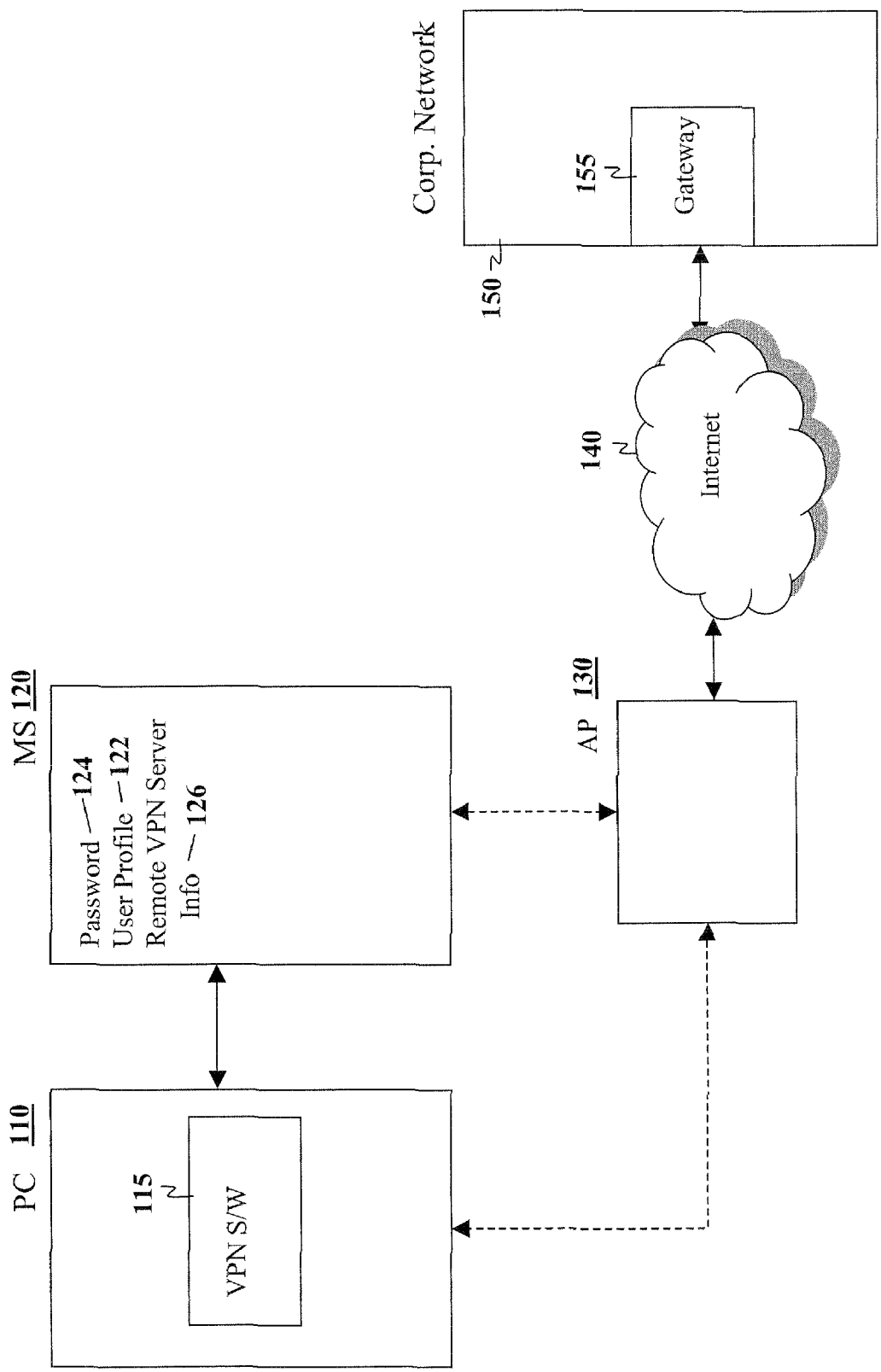
FIG. 1 is a block diagram showing connections between various components within a virtual private network according to a preferred embodiment of the present system and method.

The present method and system overcome the deficiencies of the prior art by allowing the connection to a VPN merely by connecting a mobile device to a computer. In one embodiment, the mobile device includes configuration information, such as password, user profile, and information about a remote virtual private network server, stored on the device. When connected, the mobile device tells the computer to initiate virtual private network (VPN) software situated on the computer, and the information from the mobile device is then passed to the VPN software. This enables the connection of the computer to a VPN without the user having to enter any information.

Alternatively, the VPN software could be located on the mobile device. In this case, once the mobile device is connected to the computer, the VPN software is started and the information stored on the mobile device is passed to the VPN software. The VPN software then uses this information to establish a VPN and the mobile device is a conduit between the server and the computer. The computer could, in this alternative embodiment, consider the connection to the mobile device to be a standard network connection. This requires no software installation on the client computer and thus does not require the user to have privileges on the client computer.

In either of the above cases, the mobile device could be provisioned with the user profile, VPN server information and in some cases even a password. This over the air provisioning could save the user from having to enter any information into the mobile device or computer ever.

The present application therefore provides a system for facilitating the establishment of a virtual private network between a network and a remote computer comprising: a mobile device connectable to said remote computer, the mobile device storing a user profile, virtual private network information, and password information; virtual private network software, said virtual private network software being located on one of the mobile device and the remote computer; an access point communicating with the network; and communication means for communications between the access point and one of the mobile device and the remote computer, said communications means being located on the mobile device if said virtual private network software is on said mobile device, and located on one of the mobile device or the remote computer if the virtual private network software is located on the remote computer, wherein said user profile, virtual private network information, and password information is passed to said virtual private network software upon connection of the mobile device to the remote computer, said virtual private network software using said user profile, virtual private network information, and password information to establish a virtual private network through said communications means and said access point to said network.

The present application further provides a method for facilitating the establishment of a virtual private network between a network and a remote computer comprising the steps of: connecting a mobile device to the remote computer; starting virtual private network software from the mobile device; passing, from the mobile device to virtual private network software, a user profile, virtual private network information, and password information; configuring the virtual private network software with the user profile, virtual private network information, and password information; and initiating a virtual private network from said virtual private network software using network transport.

A virtual private network (VPN) requires client software to be installed on the client side. VPN configuration always requires the user profile integrated with the installed client applications. Otherwise, VPN connections can never be obtained due to information technology (IT) security policies. Users always require a pre-configured client at home or any other remote location.

The present application provides a system and method to overcome the deficiencies of the prior art by allowing a mobile device to have built in VPN hardware and software, along with security parameters, to facilitate the immediate connection of a remote client to an enterprise network over a wired or wireless network.

Reference is now made to FIG. 1. FIG. 1 illustrates a block diagram of various components within a network to allow a remote client to access a serving network.

As illustrated in FIG. 1, a client computer 110 is used to connect to a virtual private network. Client computer 110 can be any type of computer, including a desktop or laptop computer or other computers known to those in the art.

Client computer 110, in the embodiment of FIG. 1, includes virtual private network software 115 configured on it. Such software is well known.

In the embodiment of FIG. 1, a mobile device 120 is used to allow personal computer 110 to connect to the virtual private network. Persistent memory on mobile device 120 stores a user profile 122 and can further include password 124 and remote VPN server information 126. As will be appreciated by those skilled in the art, user profile 122 includes IT information for the enterprise server, and may include: the group that a user belongs to; a user name registered in the VPN server; VPN configuration parameters.

Dynamic RSA key generation may also be produced on the device. Alternatively, RSA key generation can be provided OTA along with the service book and can be updated periodically. In some cases, such as with WiFi, Access Point or any other configuration data may be provided, such as WEP key in the enterprise campus so that a user does not need to deal with access point configuration parameters.

Password 124 could, for example, include an RSA user ID and a dynamic RSA pin generator to facilitate a secure connection to the virtual private network. VPNs can be configured in many forms: (1) A static user and password (2) A Static User ID and temporary password (expired in some time) or (3) A static user id, password id along with dynamic password components. Usually, a dynamic password component can be generated with a RSA token provided to user (for example, clipped to his/her key chain). Alternatively, the device may have an RSA token generator.

Further, the RSA key could be in an enterprise server and can be provided periodically over the air as part of the service book or could be requested by the user or even can be requested during the connection of the VPN transparently to the user.

Remote VPN server information can include an IP address on the network or a host identifier name.

Mobile device 120 can be connected to client computer 110 through various means, including a serial connection such as a USB connection or firewire connection, or wirelessly through a short range wireless protocol such as Bluetooth™ or IrDA (Infrared Data Association) connection for example. Other methods of connecting within the mobile device to the client computer 110 are also possible, and the above is not meant to limit the presence system and method in any way.

Once the mobile device 120 is connected to client computer 110, user profile 122, password 124 and remote VPN server information 126 is passed to VPN software 115, allowing VPN software 115 to initiate a VPN connection with the appropriate VPN server using network transport as described below.

As will be appreciated, all user information in the above case needs to be configured only once in the device and never on the client computer 110. Further, any available VPN software can be used on client computer 110 as long as mobile device 120 can trigger this VPN software.

Once VPN software 115 is triggered, client computer 110 tries to establish the virtual private network through an access point 130. This can be done either through a connection with client computer 110, such as a modem, or with a connection on the mobile device, such as an over the air connection such as WiFi (Wireless Fidelity).

Access point 130 connects to an enterprise server 150. In the example of FIG. 1, the access point is an access point to the Internet 140. However, access point 130 could connect to the enterprise server 150 through other networks.

Once a connection is established, gateway 155 controls access to the enterprise server 150. Using the profile and password 124, access to enterprise server 150 is negotiated and a virtual private network is established.

As will be appreciated, in the solution of FIG. 1, very little computing resources are required within the mobile device 120 as mobile device 120 is only providing configuration information and only interacting with the VPN software on the client computer 110. As will further be appreciated, mobile device 120 does not need to be network capable since a connection to access point 130 can be established through client computer 110, using, for example, a modem and further using the virtual private network software 115 on the client computer 110.

Figure 3:
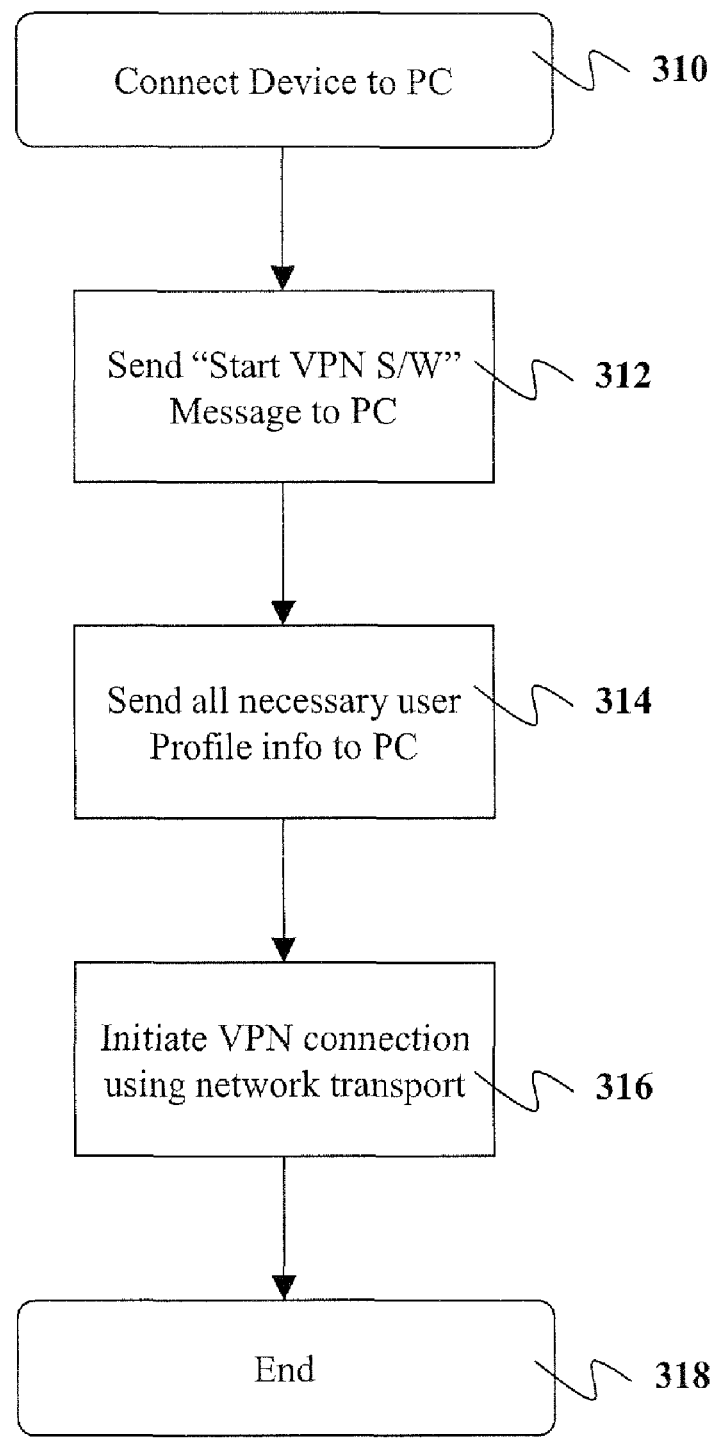
FIG. 3 is a flow-chart of a preferred method for establishing a virtual private network connection.

Reference is now made to FIG. 3. FIG. 3 shows a method for establishing a VPN connection according to the system as illustrated in FIG. 1. In step 310 a mobile device 120 (as seen in FIG. 1) is connected to the client computer 110.

The mobile device next proceeds to step 312 in which it sends a "start VPN software" message to the client computer 110. This in turn causes the client computer 110 to start the VPN software 115.

The mobile device next proceeds to step 314 in which all the necessary user profile information from user profile 122, password 124 and remote VPN server info 126 is sent to VPN software 115. This allows VPN software 115 to perform a self-configuration in order to connect to an enterprise server 150 without user intervention.

In step 316, the client computer 110 initiates the VPN connection using network transport. Such network transport could include, as illustrated in FIG. 1, an access point 130 and the Internet 140. Once the VPN is established in step 316, the initiation of the VPN is finished and the mobile device and the client computer both proceed to step 318 in which the starting process finishes. As will be appreciated, the VPN connection will remain active as long as both sides continue the VPN session.

Figure 2:
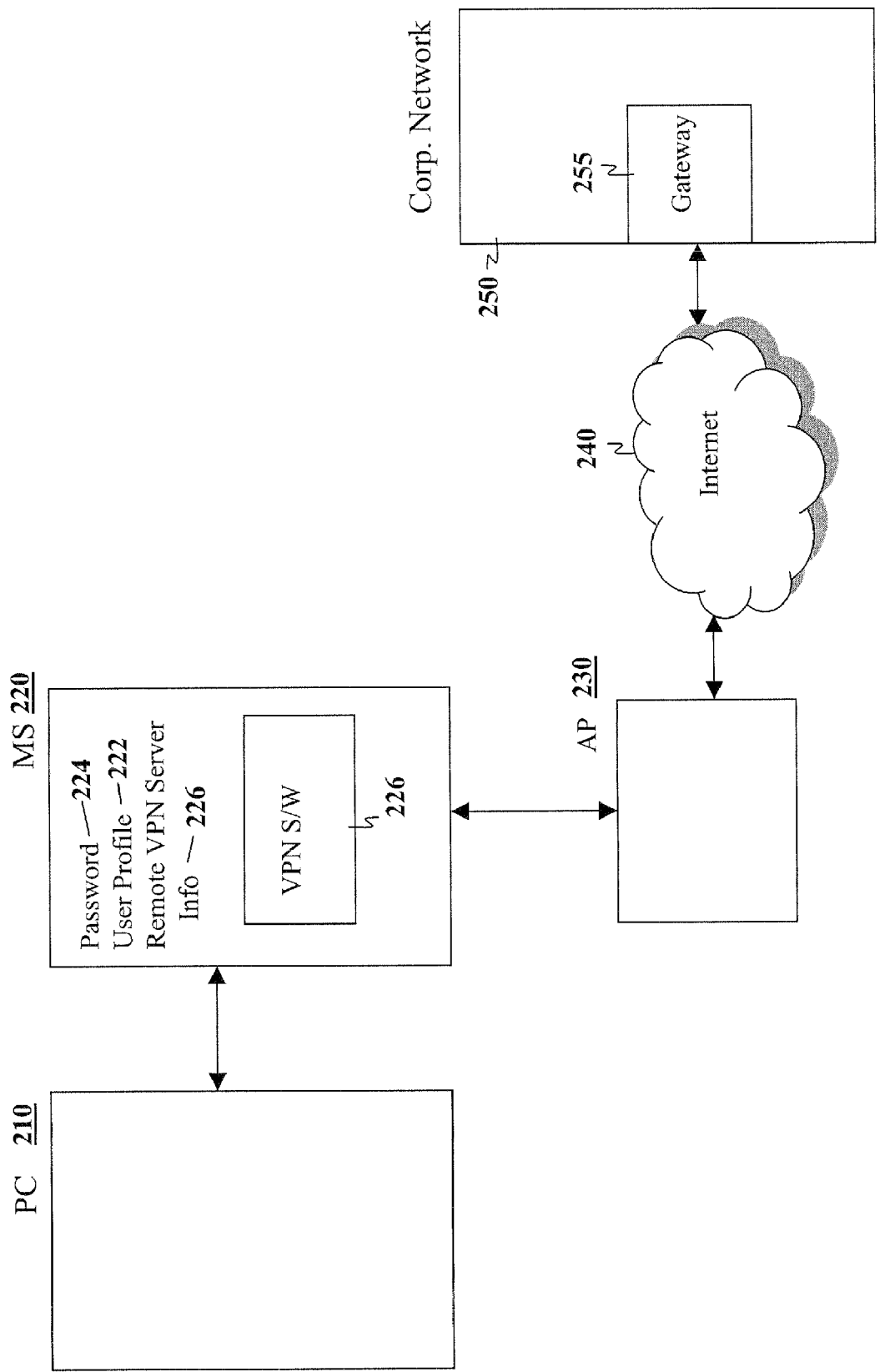
FIG. 2 is a block diagram of an alternative configuration of a virtual private network in accordance with the present system and method.

Reference is now made to FIG. 2. FIG. 2 shows an alternative embodiment of the system and method according to the present application. A client computer 210 wishes to establish a virtual private network with an enterprise server 250. In order to do this, mobile device 220 keeps track of a user profile 222, password 224 and remote VPN server info 226. This is equivalent to what was done in the embodiment of FIG. 1 with user profile 122, password 124 and remote VPN server info 126.

The embodiment of FIG. 2, however, includes VPN software 215 on mobile device 220. This allows client computer 210 to not include any VPN software on the client computer. Once the mobile device 220 is connected to client computer 210, VPN software 215 is used to establish VPN session with the server 250 through an access point 230 and a network 240. The network 240 could include the Internet or any other network as detailed above.

In the embodiment of FIG. 2, mobile device 220 represents itself to client computer 210 as a traditional network interface. All application data sent to and received from the virtual private network server 250 goes through mobile device 220.

As will be appreciated by those skilled in the art, the embodiment of FIG. 2 allows all user information to be configured only once on the mobile device 220 and never on client computer 210. Further, no VPN software 215 is required on the client computer 210.

Mobile device 220, in the embodiment of FIG. 2, must be capable of connecting to a network through an access point 230 and further be capable of running the VPN software to establish the VPN connection and to further encrypt and decrypt IP packets as they go between client computer 210 and VPN server 250.

As with the above, the VPN server 250 includes the gateway 255 to control access to the server. Parameters such as the user profile and password are passed through the gateway 255 in order to establish the VPN session.

Figure 4:
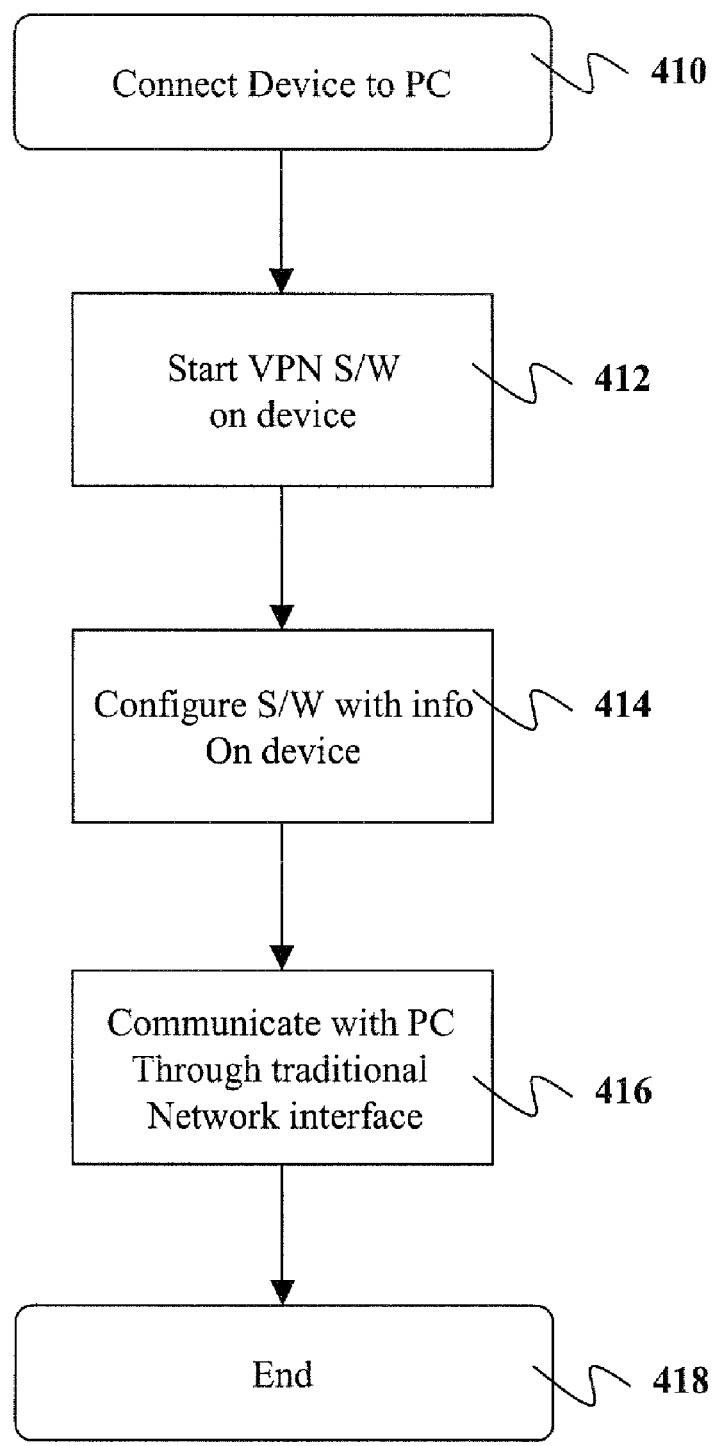
FIG. 4 is a flow-chart of an alternative method for establishing a virtual private network connection.

Reference is now made to FIG. 4, with reference numerals from FIG. 2 being used where applicable. FIG. 4 shows a method for establishing a VPN connection between a client computer 210 and a VPN server 250. Step 410, the mobile device 220 is connected to client computer 210. Mobile device next proceeds to step 412 in which it starts the virtual private network software on the mobile device 220. The mobile device next proceeds to step 414 in which the virtual private network software 215 is configured with information that is stored on the mobile device 220.

The mobile device 220 next proceeds to step 416 in which it communicates with a gateway 255 through a traditional network interface with reference to FIG. 2 in order to establish the VPN connection. As will be appreciated, various information such as an RSA password and user profile will be sent to gateway 255 in order to establish the VPN connection.

Once the VPN connection is established in step 416, the mobile device next proceeds to step 418 in which the attempt to establish the VPN connection is completed and the method to establish the VPN connection is therefore ended.

As will be appreciated by those skilled in the art, if the mobile device 220 is lost or stolen, IT policy will generally restrict access from the device, marking it "kill" or "out of commission".

Figure 5:
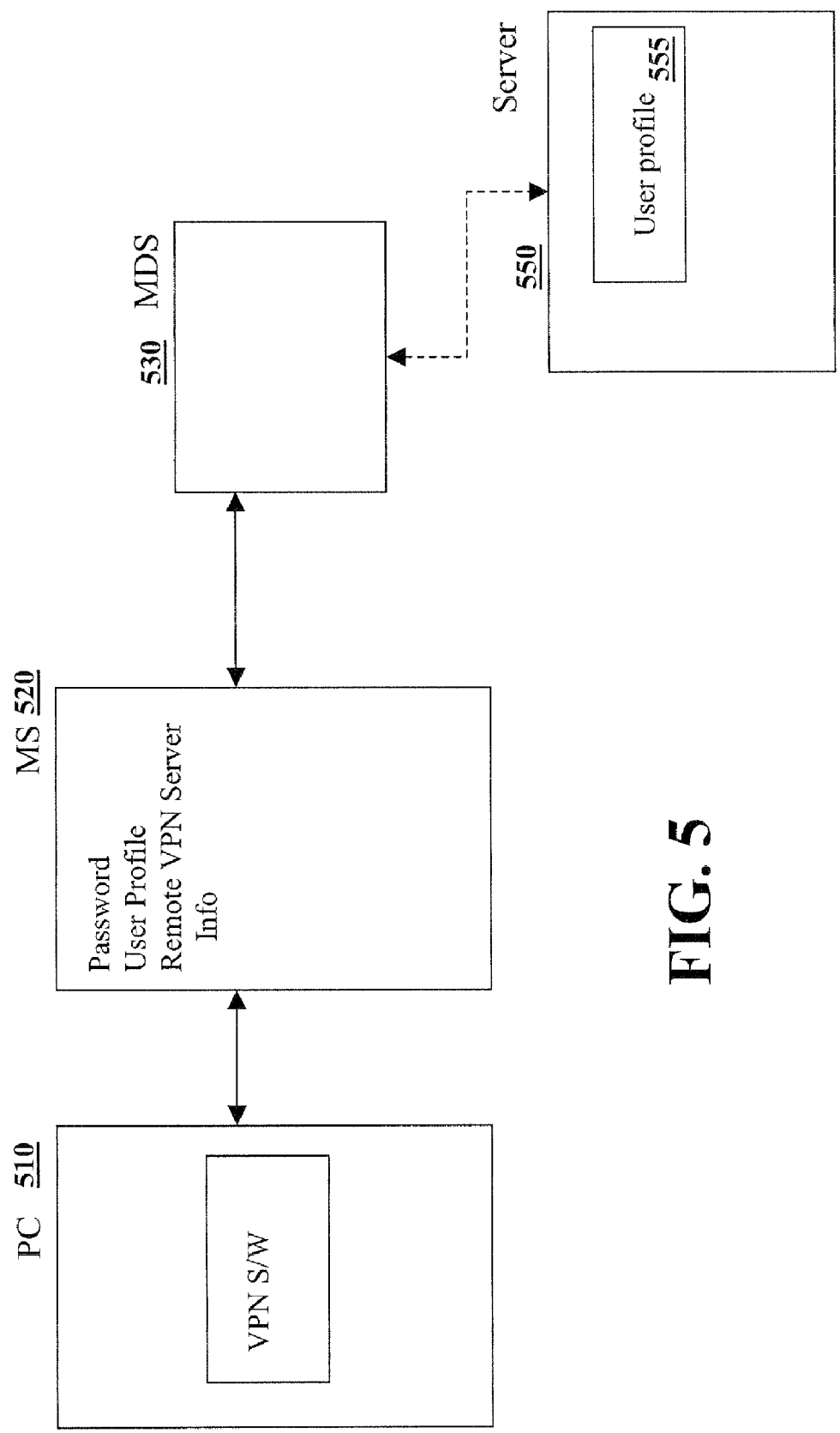
FIG. 5 is a block diagram of the components according to the present system for downloading user profile to a mobile device.

User profile information 122 and 222, various information to establish a RSA secure ID for the password 124 and 224 and the specific VPN server information 126 and 226 can either be pre-programmed on the mobile device 220 and 120, can be downloaded manually by the user, or, in certain cases, can be provisioned over the air. Reference is now made to FIG. 5.

FIG. 5 shows the location of the VPN software as in preferred embodiment of the system of FIG. 1. However, as will be appreciated by those skilled in the art, the VPN software could also be located on mobile device 220 as illustrated in FIG. 2.

In FIG. 5, client computer 510 includes VPN software 515 and communicates to a mobile device 520. Mobile device communicates with a wireless network that includes a multi point distribution system 530 (MDS), which in turn communicates with a server 550 through a network as would be appreciated by those skilled in the art.

Mobile device 520 can request, from server 550, user profile information 555 which could then be used for configuring the virtual private network software 515. This saves the user from creating the user profile or from the information being re-configured during device manufacturing or configuration.

The provisioning of the user profiles over the air through either MDS protocol or other over the air protocols such as service boot protocols is an optional element, and while it enhances the method and system of the present application, it is not required. The present application therefore provides a mobile device that includes a piping rule between a VPN server and a host client platform. Using a serial connection or other connection to the mobile device, an IP session is created and signals can then be piped in and out of the client using the mobile device.

Figure 6:
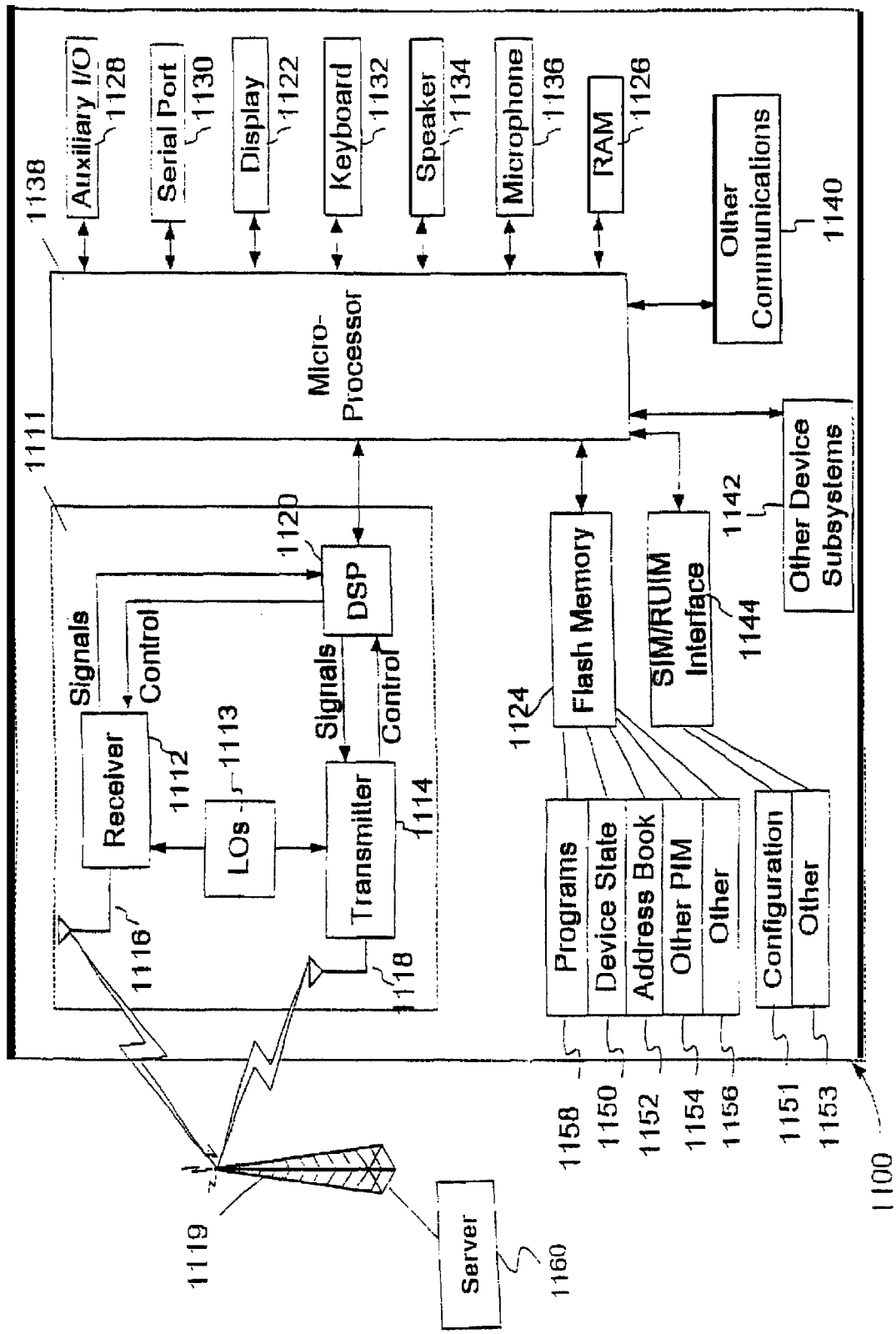
FIG. 6 is a block diagram of an exemplary mobile device that can be used in accordance with the present system and method.

One skilled in the art will appreciate that many mobile devices could be used to implement the above. FIG. 6 illustrates an exemplary mobile device that could be used with the above method and system. Mobile device 1100 is preferably a two-way wireless communication device having at least voice and data communication capabilities. Mobile device 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication subsystem 1111 will be dependent upon the communication network in which the device is intended to operate. For example, mobile device 1100 may include a communication subsystem 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile device 1100 is registered on the network using a unique identification number associated with each mobile device. In UMTS and GPRS networks, and in some CDMA networks, however, network access is associated with a subscriber or user of mobile device 1100. A GPRS mobile device therefore requires a subscriber identity module (SIM) card in order to operate on a GPRS network, and a RUIM in order to operate on some CDMA networks. Without a valid SIM/RUIM card, a GPRS/UMTS/CDMA mobile device may not be fully functional. Local or non-network communication functions, as well as legally required functions (if any) such as emergency calling, may be available, but mobile device 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile device 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile device 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 6 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile device. A predetermined set of applications that control basic operations, including at least data and voice communication applications for example, will normally be installed on mobile device 1100 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile device user's corresponding data items stored or associated with a host computer system. Further applications may also be loaded onto the mobile device 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile device 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile device 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile device 1100 is similar, except that received signals would preferably be output to a speaker 1134 and signals for transmission would be generated by a microphone 1136. Alternative voice or audio I/O subsystems, such as a voice message recording subsystem, may also be implemented on mobile device 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 6 would normally be implemented in a personal digital assistant (PDA)-type mobile device for which synchronization with a user's desktop computer (not shown) may be desirable. Such a port 1130 would enable a user to set preferences through an external device or software application and would extend the capabilities of mobile device 1100 by providing for information or software downloads to mobile device 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile device 1100 and different systems or devices, which need not necessarily be similar devices. For example, the subsystem 1140 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A system for establishing a virtual private network through an enterprise server comprising:
    a client computer which is pre-configured;
    a mobile communications device connectable to the client computer, the mobile communications device storing a user profile for establishing the virtual private network; and
    virtual private network software located on the client computer,
    wherein, upon connection of the mobile communications device to the client computer, the mobile communications device performs the steps of:
    invoking the virtual private network software; and
    providing the user profile to the virtual private network software;
and wherein upon receiving the user profile, the virtual private network software performs the step of:
    communicating with the enterprise server through the mobile communications device to establish a virtual private network with the user profile.

2. The system of claim 1, wherein the mobile communications device communicates through an access point with the enterprise server.

3. The system of claim 2, wherein the user profile and password are selected from one of:
    a static user identifier and password;
    a static user identifier and a temporary password; and
    a static user identifier and a password identifier and a dynamic component.

4. The system of claim 2 wherein the password is provisioned onto the mobile communications device.

5. The system of claim 4, wherein the provisioning is performed through a multi point distribution system.

6. The system of claim 1, wherein the mobile communications device further stores a password, remote virtual private network server information, or both a password and remote virtual private network server information.

7. The system of claim 1, wherein the user profile comprises one or more of group information, user name registered, or virtual private network configuration parameters.

8. The system of claim 1, wherein the mobile communications device further comprises access point configuration data.

9. The system of claim 1, wherein the user profile is provisioned onto the mobile communications device.

10. The system of claim 9, wherein the provisioning is performed through a multi point distribution system.

11. A method for establishing a virtual private network through an enterprise server in a system having a client computer which is pre-configured; a mobile communications device connectable to the client computer, the mobile communications device storing a user profile for establishing the virtual private network; and virtual private network software located on the mobile communications device, the method comprising:
    establishing a connection between the mobile communications device and the client computer;
    starting the virtual private network software from the mobile communications device;
    passing the user profile to the private network software; and
    the virtual private network software communicating with the enterprise server through the mobile communications device to establish a virtual private network with the user profile.

12. The method of claim 11, wherein the mobile communications device communicates through an access point with the enterprise server.

13. The method of claim 12, wherein the user profile and password are selected from one of:
    a static user identifier and password;
    a static user identifier and a temporary password; and
    a static user identifier and a password identifier and a dynamic component.

14. The method of claim 12 wherein the password is provisioned onto the mobile communications device.

15. The method of claim 14, wherein the provisioning is performed through a multi point distribution system.

16. The method of claim 11, further comprising storing a password, remote virtual private network server information, or both a password and remote virtual private network server information on the mobile device.

17. The method of claim 11, wherein the user profile comprises one or more of group information, user name registered, or virtual private network configuration parameters.

18. The method of claim 11, wherein the mobile communications device further comprises access point configuration data.

19. The method of claim 11, wherein the user profile is provisioned onto the mobile communications device.

20. The method of claim 19, wherein the provisioning is performed through a multi point distribution system.

* * * * *

UNITED STATES PATENT AND TRADEMARK OFFICE
CERTIFICATE OF CORRECTION

PATENT NO.        : 8,112,797 B2
APPLICATION NO.   : 12/975835
DATED             : February 7, 2012
INVENTOR(S)       : Risvan Coskun et al.

It is certified that error appears in the above-identified patent and that said Letters Patent is hereby corrected as shown below:

Title page, Item 73, Assignee replace "Research in Motion" with - "Research In Motion Limited"

Signed and Sealed this
Fifteenth Day of January, 2013

David J. Kappos
*Director of the United States Patent and Trademark Office*